United States Patent [19]

Wilde

[11] 3,869,584

[45] Mar. 4, 1975

[54] HEADSET

[75] Inventor: Helmüt Wilde, Pforzheim, Germany

[73] Assignee: International Standard Electric Corporation, New York, N.Y.

[22] Filed: June 11, 1973

[21] Appl. No.: 368,799

[30] Foreign Application Priority Data

June 22, 1972 Germany ............................ 2230637

[52] U.S. Cl. ............................................... 179/156
[51] Int. Cl. ............................................ H04m 1/05
[58] Field of Search ............ 179/1 HF, 81 B, 100 L, 179/182 R, 156 R

[56] References Cited

UNITED STATES PATENTS

| | | | |
|---|---|---|---|
| 1,401,753 | 12/1921 | Blossonnault | 179/182 R |
| 3,087,028 | 4/1963 | Bonnin | 179/156 R |
| 3,335,720 | 8/1967 | Aileo | 179/182 R |

*Primary Examiner*—Ralph D. Blakeslee
*Attorney, Agent, or Firm*—John T. O'Halloran; Menotti J. Lombardi, Jr.; Alfred C. Hill

[57] ABSTRACT

A headset consisting of receiver, microphone, and microphone amplifier, particularly for use with radio telephones, which permits the wearer to binaurally perceive ambient noise at least during the listening pauses and can also be worn simultaneously with a gas mask.

9 Claims, 7 Drawing Figures

HEADSET

Headsets are used, e.g., in telephone engineering, to enable the operator of a switchboard to have both hands free for the servicing of calls and for jotting down notes. In this case, they mostly consist of a headphone or a pair of headphones to be worn at the head, with this structure having a microphone holder mounted thereto and the microphone placed in front of the lips. An example of a modification of such an equipment is shown in German Printed Application No. 1,762,001. In such sets, the microphones always pick up more of less room noise depending on the type used. In the listening process, a pair of headphones suppresses the room noise; with a single headphone, the wearer looses the perception of the direction from which the room noise is coming.

Headsets are also used for speech communication in very noisy locations. In these sets, the microphone and the receiver are mostly incorporated in headgears, with the receiver closing the ear, and the microphone being a throat microphone or osteophone. Such equipment is used for communication aboard aircraft, for artillery purposes, and for communication from engine rooms. A modification of such a headset is shown in German Pat. No. 559,258.

In such equipment for talking and listening, room noise is largely suppressed. The user can no longer determine the direction from which the ambient noise is coming.

The invention characterized by claim 1 has for its object to provide a headset in which the influence of the ambient noise on the receiver is virtually completely suppressed, while the sounds radiated by the earphone are applied to the free ear in such a manner that even in high room noise conditions good intelligibility is insured, while, at least during the listening pause, the binaural effect, i.e., the possibility of determining the direction from which the sound is arriving, is fully preserved. Furthermore, the set is to be usable together with face shields and respirators.

The advantage over the known headsets resides in the fact that the wearer, unhampered by such a set, can freely talk with the people near him. If a press-to-talk button is used, the transmission of such conversations can be prevented. Since, at least during the listening pauses but also at reduced signal strength of reception, his perception of the direction of sound impressions from the environment is not influenced, the wearer can determine the direction from which sound signals are arriving, which is of particular importance if such sets are used, for example, by policemen and firemen.

The invention will now be described in detail with reference to the accompanying drawings, in which:

FIGS. 1*a* to 1*c* show the headset according to the invention in a front view of the outside and in a front view of the inside, resting against the head, as well as in a side view;

FIGS. 2*a* to 2*b* show this set with sheathed, horn-type sound conductor;

Figures 1A, 1B:
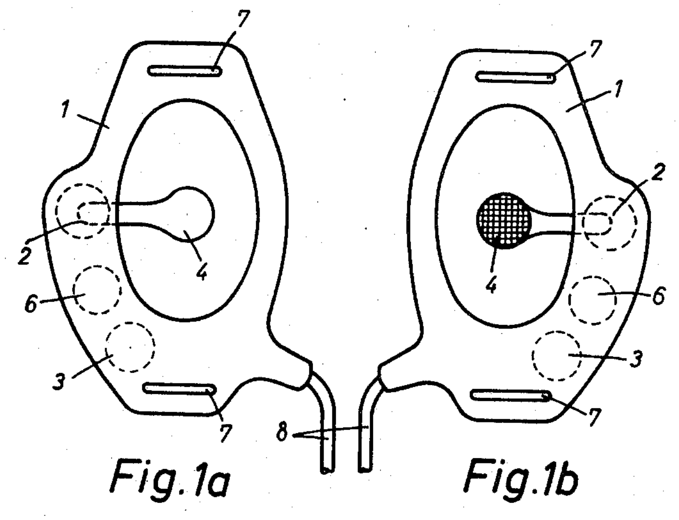
Figure 1C:
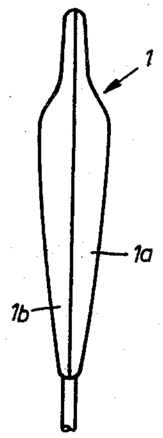
Figure 2A:
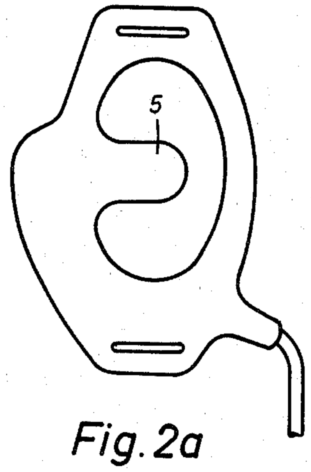
Figure 2B:
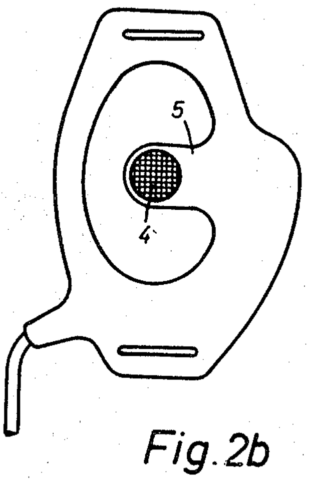

FIG. 1 shows the headset according to the invention. FIG. 1*a* shows a front view of the outside, and FIG. 1*b* a front view of the inside, resting against the head, while FIG. 1*c* is a side view, with the side shown in FIG. 1*b* indicated by an arrow. Designated 1 is a ringshaped collar whose opening leaves the ear open. The receiver 2, the microphone 3, and an amplifier 6, which are located inside the collar, are shown dotted. From the aperture of the receiver 2, a sound conductor 4 leads to the ear entrance, located about in the middle of the collar opening. It is approximately designed, in a known manner, as a bent exponential horn. Where the receiver and the microphone (2 and 3, respectively), etc. must be accomodated, the ring-shaped collar 1 has a thicker cross section, as can be seen in FIG. 1*c*. The headset shown in FIGS. 2*a* and 2*b* differs from that of FIG. 1 only in that the ring-shaped collar 1 has an extension 5 which projects into the collar opening and sheathes and mechanically protects the horn-type sound conductor 4.

Figure 3:
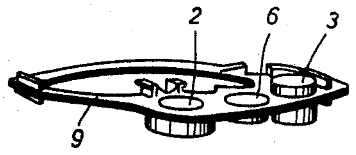
FIG. 3 is a diagram of the component support.

FIG. 3 shows a diagram of the component support 9, which is located inside the ring-shaped collar. This support is made of plastic and holds the receiver 2, microphone 3, and amplifier 4 in place. Also provided are fastening elements for the horn-type sound conductor 4 and the lead terminals 8. Placed around the component support 9, which is equipped with these components and wired, are two half shells 1*a* and 1*b* (FIG. 1*c*) forming the ring-shaped collar 1, which are joined together. These half shells may be injection-molded parts and can then be joined together by adhesive bonding. Acoustically, it has proved particularly advantageous to make these half shells 1*a* and 1*b* of polyurethane foam.

Figure 4:
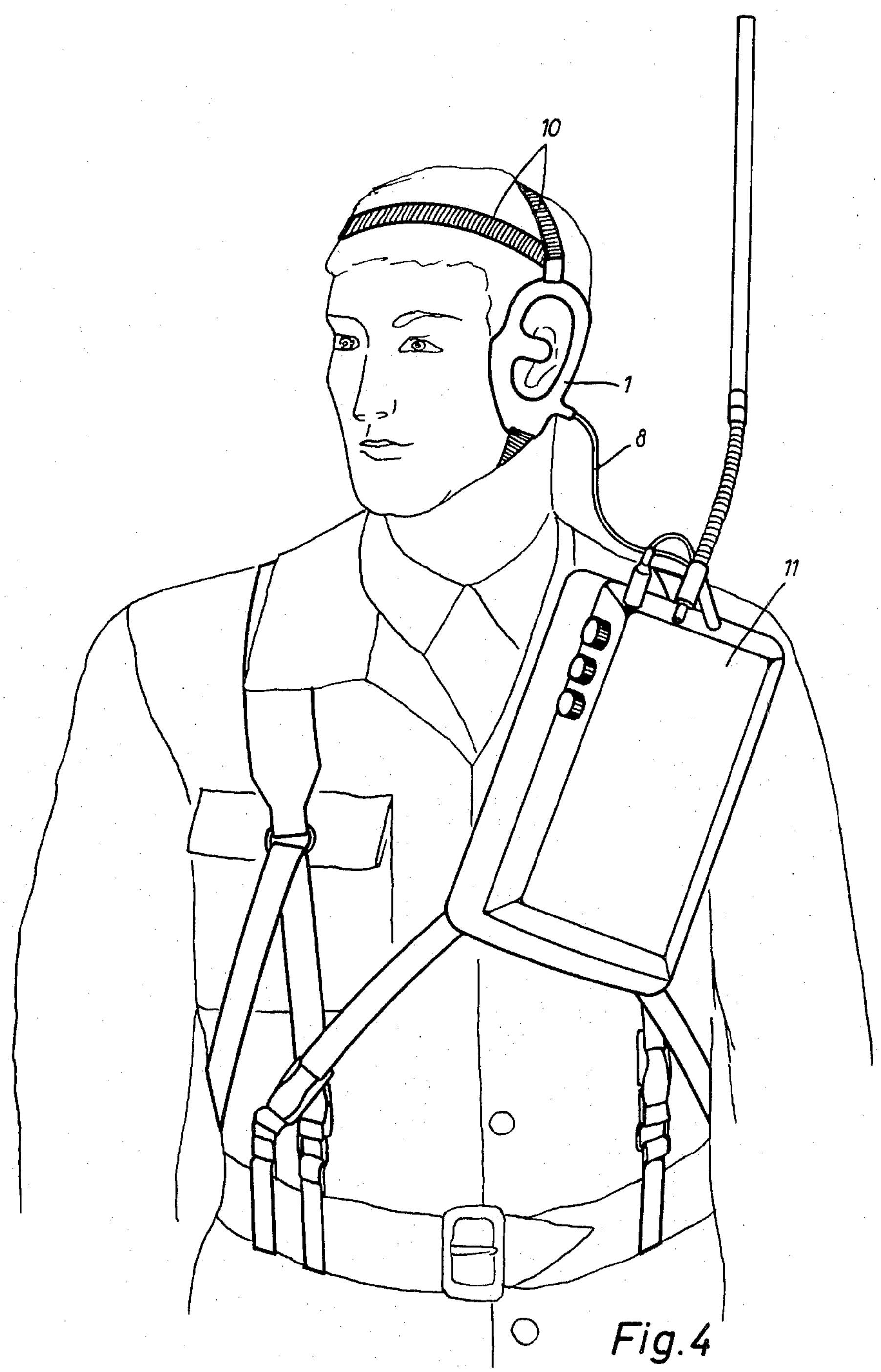
FIG. 4 is a diagram showing the set at the wearer's head.

The headset is secured to the wearer's head, as shown in FIG. 4, by means of headbands 10, which are passed through slots 7 of the ring-shaped collar 1. However, a bow similar to a headphone bow may be provided, too. By the reference numeral 11, a radiotelephone is indicated. As is also apparent from FIG. 4, the headset according to the invention also allows face shields and respirators to be worn simultaneously, which permits its use in special missions of the fire department and of the police.

For the further explanation of the structure of the headset according to the invention, the acoustic requirements to be met by this set must be dealt with. It has already been pointed out in the introduction that the headset according to the invention is to enable the wearer to hear ambient noise binaurally at least during the listening pauses. Associated therewith, however, is the requirement that the speech radiated by the receiver be well readable even in high ambient noise conditions. The receiver used is therefore a moving-coil pressure-chamber system, with which, if a sound conductor with the approximate shape of an exponential horn is placed ahead, optimum matching of the acoustic microphone impedance to the free air space can be achieved thanks to the velocity transformation taking place. Thus, good efficiency can be achieved although, acoustically, the earphone and the microphone do not form a closed system, if, in known manner, the stiffness of the air cushion behind the diaphragm of the pressure-chamber system is chosen to be equal to the acoustic inductance of the air volume in the exponential horn. Since such pressure-chamber systems with acoustic horns prefer the medium and high-frequency ranges, resonances at 1,000 and 2,000 Hz can easily be achieved, which results in a brilliant and clear timbre of speech and, thus, in good intelligibility even in high ambient noise conditions, this being favored by the fact that the ear has its highest sensitivity in this range, too.

As for the receiver, it must be required that ambient noise be not transmitted at all, as far as possible. Speech transmission is to be possible, however, which is as true to nature and brilliant as possible. The known throat microphones mostly used for such headsets mainly transmit the voiced sounds and suppress the formants produced in the oral cavity and with the tongue, teeth, and lips. They show relative good sensitivity but falsify the timbre, thus resulting in poor syllable articulation; in addition, they are sensitive to shock. Therefore, the headset according to the invention uses a moving-coil pressure-gradient microphone energized by bone conduction. The principle and operation of a moving-coil pressure-gradient microphone are well-known. To make such a microphone suitable for use as a contact microphone, it is incorporated into a totally enclosed, rigid, cylindrical case. That side of the cover of the case which is adjacent to the moving-coil diaphragm is provided with ring-shaped beads at the rim so as to be capable of oscillating as a piston diaphragm. A seal inserted between the attachment of the moving-coil diaphragm and the cover rim outside the beads and made, for example, of silicon rubber insures that the air between the two diaphragms cannot escape. By this air cushion between the two diaphragms, the latter are coupled together, the coupling coefficient being determined by the enclosed quantity of air and being inversely proportional thereto.

As the coupling coefficient increases, the transmission range shifts toward higher frequencies. However, this is limited by the unavoidable dimensional tolerances of the two diaphragms. Since the moving-coil diaphragm of a contact microphone constructed in this way can be actuated only via the piston diaphragm resting against the body and virtually not by airborne sound, room noise is suppressed by 40 db and more. Thus, the intelligence signal is virtually free from undesired noise.

If it is insured that the piston diaphragm contacts the surface of the head in the vicinity of the jawbone rather than near the larynx, not only the voiced sounds but also the formants are transmitted because both are subject to the same attenuation on their way to this point and, therefore, have about equal oscillation amplitudes. The speech transmitted in this way loses little of its timbre and of its brilliance, which fact also results in high syllable articulation. The only advantage could be the low efficiency, but this can be overcome by incorporating a suitable amplifier using integrated-circuit techniques..

What is claimed is:

1. A headset to be worn at an ear of a user and in contact with a jaw bone of said user comprising:
two annular half shells being bonded together to form a ring-like collar having an opening encircling the external portion of said ear of said user;
a receiver disposed within said collar adjacent said ear of said user;
a bone conduction actuated microphone disposed within said collar adjacent said jaw bone of said used, said microphone being actuated by body-borne sound in the vicinity of said jaw bone; and
a horn-type sound conductor disposed within said shells coupled to said receiver and extending into approximately the middle of said opening of said collar to transmit sound radiated by said receiver to the entrance of said ear of said user.

2. A headset according to claim 1, further including an extension of said collar into said opening of said collar to sheath and mechanically protect said sound conductor.

3. A headset according to claim 2, wherein said receiver is a pressure-chamber system.

4. A headset according to claim 3, wherein said microphone is a moving-coil pressure-gradient microphone.

5. A headset according to claim 4, further including an amplifier for said microphone disposed within said collar.

6. A headset according to claim 5, further including a component support disposed within said collar, said support having secured thereto said receiver, said microphone and said amplifier.

7. A headset according to claim 6, wherein said half shells are polyurethane foam bonded together by an adhesive bonding agent.

8. A headset according to claim 7, further including two slots in said collar, one slot being disposed adjacent the top thereof and the other slot being disposed adjacent the bottom thereof; said two slots receiving support devices to enable said headset to be supported by the head of said user.

9. A headset according to claim 8, wherein said support devices include
at least two bands secured to said one slot to engage the surface of the head of said user, and
a chin strap secured to said other slot to engage the chin of said user adjacent the throat of said user.

* * * * *